United States Patent
McMeekin et al.

(10) Patent No.: US 10,033,511 B2
(45) Date of Patent: Jul. 24, 2018

(54) SYNCHRONIZATION OF CO-LOCATED RADIOS IN A DYNAMIC TIME DIVISION DUPLEX SYSTEM FOR INTERFERENCE MITIGATION

(71) Applicant: FreeWave Technologies, Inc., Boulder, CO (US)

(72) Inventors: Steven E. McMeekin, Evergreen, CO (US); Timothy G. Mester, Longmont, CO (US); Jeffrey A. Battin, Lafayette, CO (US); Yan Zhang, Bellevue, WA (US)

(73) Assignee: FreeWave Technologies, Inc., Boulder, CO (US)

( * ) Notice: Subject to any disclaimer, the term of this patent is extended or adjusted under 35 U.S.C. 154(b) by 106 days.

(21) Appl. No.: 14/924,309

(22) Filed: Oct. 27, 2015

(65) Prior Publication Data
US 2016/0127110 A1    May 5, 2016

Related U.S. Application Data

(60) Provisional application No. 62/072,267, filed on Oct. 29, 2014.

(51) Int. Cl.
*H04J 3/00* (2006.01)
*H04L 5/14* (2006.01)
*H04W 56/00* (2009.01)
*H04B 1/403* (2015.01)
(Continued)

(52) U.S. Cl.
CPC .............. *H04L 5/14* (2013.01); *H04B 1/406* (2013.01); *H04W 56/0005* (2013.01); *H04W 72/0446* (2013.01); *H04W 72/082* (2013.01)

(58) Field of Classification Search
None
See application file for complete search history.

(56) References Cited

U.S. PATENT DOCUMENTS

| | | | |
|---|---|---|---|
| 5,488,632 | A | 1/1996 | Mason et al. |
| 7,359,311 | B1 | 4/2008 | Paranjpe et al. |
| 7,746,896 | B2 | 6/2010 | Venkatachalam |
| (Continued) | | | |

OTHER PUBLICATIONS

Non-Final Office Action from co-pending U.S. Appl. No. 14/924,349, dated Feb. 27, 2017; 41 pages.

*Primary Examiner* — Otis L Thompson, Jr.

(57) ABSTRACT

A method for operating at least a first of a plurality of co-located, non-time synchronous radios at a first location communicating data by frames with one or more other remote radios at a second and optionally additional locations in a wireless communication system, to synchronize first or uplink and/or second or downlink frame portions of the frames to mitigate interference between the co-located radios. A frame table of attributes of uplink and/or downlink frame portions associated with frames of the first radio is stored. The spectral content of transmissions from at least a second of the co-located radios is monitored. Based on the monitored spectral content, characteristics for uplink and/or downlink frame portions of the first co-located radio to mitigate interference with the at least second co-located radio are determined. Attributes in the frame table to enable interference-optimized uplink and/or downlink portions of frames of the first co-located radio are updated.

11 Claims, 4 Drawing Sheets

(51) Int. Cl.
*H04W 72/04* (2009.01)
*H04W 72/08* (2009.01)

(56) References Cited

U.S. PATENT DOCUMENTS

| | | | |
|---|---|---|---|
| 8,509,711 | B1 | 8/2013 | Bagley et al. |
| 8,787,873 | B1 | 7/2014 | Hitt et al. |
| 9,117,457 | B2 | 8/2015 | Kwan et al. |
| 9,584,170 | B2 | 2/2017 | Mester et al. |
| 9,628,141 | B2 | 4/2017 | Wyss et al. |
| 2002/0146994 | A1 | 10/2002 | Marrah et al. |
| 2003/0176161 | A1 | 9/2003 | Dale et al. |
| 2003/0210663 | A1 | 11/2003 | Everson et al. |
| 2006/0074558 | A1 | 4/2006 | Williamson et al. |
| 2006/0171335 | A1 | 8/2006 | Yuen et al. |
| 2006/0256884 | A1 | 11/2006 | Tomioka et al. |
| 2008/0089443 | A1 | 4/2008 | Sanada et al. |
| 2008/0107079 | A1 | 5/2008 | Bae et al. |
| 2009/0040937 | A1* | 2/2009 | Xhafa ............ H04L 41/5003 370/252 |
| 2009/0225741 | A1 | 9/2009 | Wang et al. |
| 2009/0253387 | A1 | 10/2009 | van Rensburg et al. |
| 2009/0258665 | A1 | 10/2009 | Bourlas et al. |
| 2009/0298522 | A1 | 12/2009 | Chaudhri et al. |
| 2009/0303918 | A1 | 12/2009 | Ma et al. |
| 2010/0226491 | A1 | 9/2010 | Conte et al. |
| 2010/0311452 | A1 | 12/2010 | Li et al. |
| 2011/0122831 | A1 | 5/2011 | Kim et al. |
| 2012/0184284 | A1 | 7/2012 | Moisio et al. |
| 2012/0230453 | A1 | 9/2012 | Shih et al. |
| 2013/0003674 | A1 | 1/2013 | Lin et al. |
| 2013/0051293 | A1 | 2/2013 | Wentink et al. |
| 2013/0102305 | A1 | 4/2013 | Liu et al. |
| 2013/0215219 | A1 | 8/2013 | Hefeeda et al. |
| 2013/0265915 | A1 | 10/2013 | Choi et al. |
| 2014/0119216 | A1 | 5/2014 | Patel et al. |
| 2014/0153625 | A1 | 6/2014 | Vojcic et al. |
| 2014/0221028 | A1* | 8/2014 | Desai ............ H04B 15/00 455/501 |
| 2014/0247800 | A1 | 9/2014 | Ro et al. |
| 2014/0254639 | A1 | 9/2014 | Tahir et al. |
| 2014/0341133 | A1 | 11/2014 | Wang |
| 2015/0092761 | A1 | 4/2015 | Kim et al. |
| 2015/0117227 | A1 | 4/2015 | Zhang et al. |
| 2015/0124688 | A1* | 5/2015 | Xu ............ H04B 7/0452 370/312 |
| 2015/0133185 | A1* | 5/2015 | Chen ............ H04W 72/1215 455/552.1 |
| 2015/0263816 | A1* | 9/2015 | Hinman ............ H04J 3/0676 370/280 |
| 2015/0334575 | A1* | 11/2015 | Joshi ............ H04W 72/0453 370/329 |
| 2015/0381291 | A1* | 12/2015 | Mahajan ............ H04B 15/00 370/252 |
| 2016/0126988 | A1 | 5/2016 | Mester et al. |
| 2016/0127009 | A1 | 5/2016 | McMeekin et al. |
| 2016/0127953 | A1 | 5/2016 | McMeekin et al. |
| 2016/0128010 | A1 | 5/2016 | McMeekin et al. |
| 2016/0156750 | A1 | 6/2016 | Zhang et al. |

* cited by examiner

SYNCHRONIZATION OF CO-LOCATED RADIOS IN A DYNAMIC TIME DIVISION DUPLEX SYSTEM FOR INTERFERENCE MITIGATION

CROSS REFERENCE TO RELATED APPLICATION

This application claims the benefit of U.S. Provisional Application Ser. No. 62/072,267 filed on Oct. 29, 2014 and entitled Synchronization of Co-Located Radios In A Dynamic Time Division Duplex System For Interference Mitigation, which is incorporated herein by reference in its entirety and for all purposes.

BACKGROUND

Wireless communication systems are known and commercially available. In systems of these types, radios are sometimes co-located (e.g., mounted on the same antenna tower). Interference between these co-located radios can reduce the ability of the co-located radios to effectively communicate with other remotely located radios. There remains, therefore, a continuing need for radios and methods of operation that manage and mitigate interference between co-located radios.

SUMMARY

Embodiments of the invention include a method for operating at least a first of a plurality of co-located, non-time synchronous radios at a first location communicating data by frames with one or more other remote radios at a second and optionally additional locations in a wireless communication system, to synchronize first or uplink and/or second or downlink frame portions of the frames to mitigate interference between the co-located radios. In embodiments, a frame table of attributes of uplink and/or downlink frame portions associated with frames of the first radio is stored. The spectral content of transmissions from at least a second of the co-located radios is monitored. Based on the monitored spectral content, characteristics for uplink and/or downlink frame portions of the first co-located radio to mitigate interference with the at least second co-located radio are determined. Attributes in the frame table to enable interference-optimized uplink and/or downlink portions of frames of the first co-located radio are updated.

DESCRIPTION OF THE INVENTION

Figure 1:
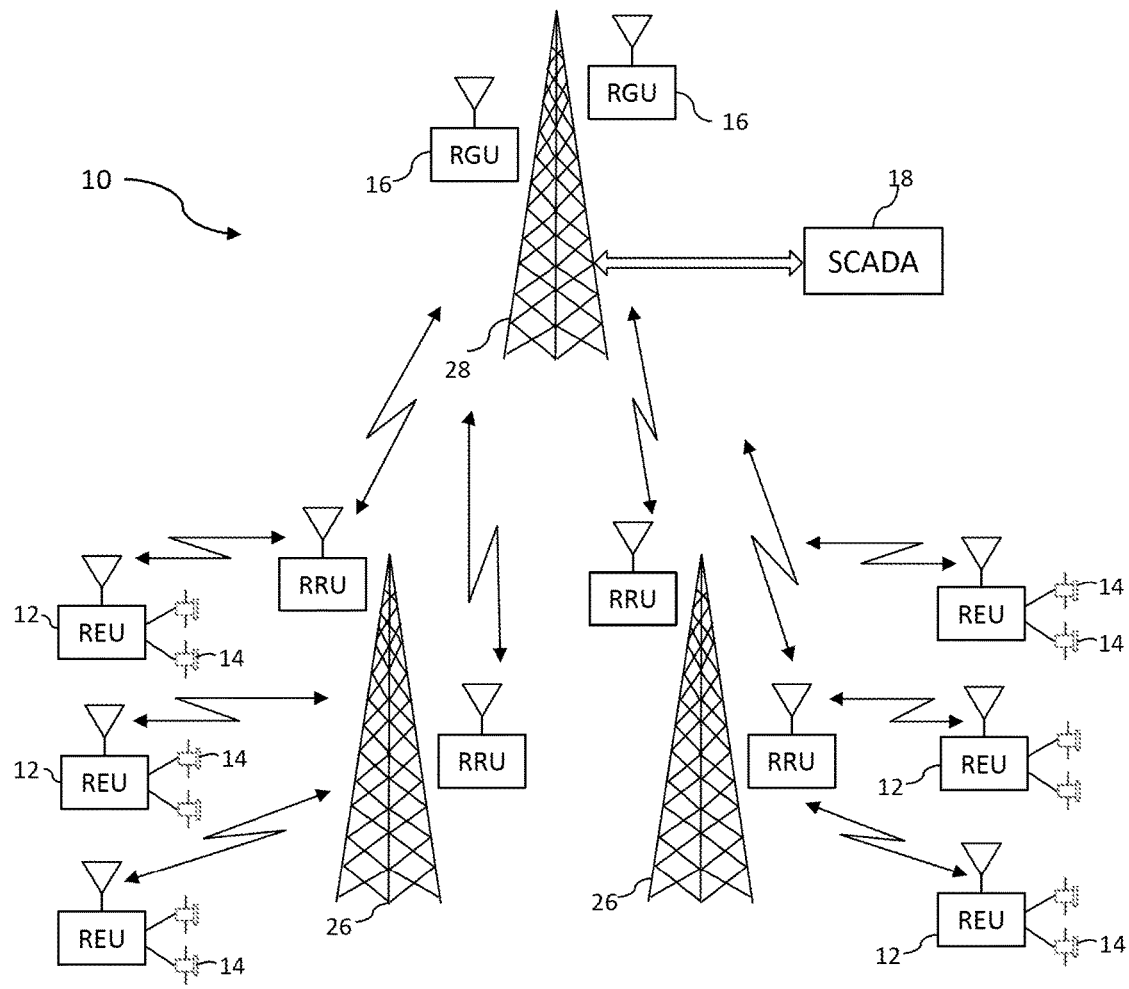
FIG. 1 is a diagrammatic illustration of a wireless communication system in accordance with embodiments of the invention.

FIG. 1 is a diagrammatic illustration of a wireless communication system 10 that can include synchronized co-located radios in accordance with embodiments of the invention. As shown, system 10 includes a plurality of transceivers or radios such as radio endpoint units (REUs) 12, each of which is connected to one or more sensors 14. Data collected by sensors 14 or other information is transmitted by the REUs 12 to one or more remote radios such as radio gateway units (RGUs) 16, which can be connected by conventional communication networks (e.g., wired or wireless networks) to a system 18 such as supervisory control and data acquisition system (SCADA) that uses the collected data (e.g., for process control or information management). In the illustrated embodiment, the REUs 12 wirelessly communicate with the RGUs 16 through radios such as radio repeater units (RRUs) 20. Other embodiments, e.g., where the REUs 12 and RGUs 16 are within range of each other, do not include RRUs 20. A plurality of radios such as RRUs 20 can be co-located at a location or site, such as on a common antenna tower. In the illustrated embodiment, for example, each of antenna towers 24 and 26 includes two RRUs 20. Similarly, a plurality of co-located RGUs 16 are shown mounted to antenna tower 28. The sites of antenna towers 24, 26 and 28 are typically remotely located with respect to one another.

In embodiments, REUs 12, RGUs 16 and RRUs 20 can be configured as time division multiple access (TDMA) radios that operates at one of over a wide range of carrier frequencies such as 100 MHz-6 GHz, and channel bandwidths such as 6.25 KHz-10 MHz. Other embodiments of the invention operate at other frequency bands, other channel bandwidths and/or at multiple carrier frequencies, and can be configured with other physical layers and hardware structures. One or more suitable modulation schemes such as, for example, FSK (frequency shift keying) QPSK (quadrature phase shift keying), 16QAM (quadrature amplitude modulation) and 64QAM, and multicarrier schemes such OFDM (orthogonal frequency division multiplexing) and OFDMA (orthogonal frequency division multiple access) can be used. In embodiments, the REUs 12, RGUs 16 and RRUs 20 can dynamically select modulation schemes based on factors such as desired data transmission rates, available channel bandwidth and interference levels. Applications of REUs 12, RGUs 16 and RRUs 20 include, for example, oil and gas field management, water and wastewater management, location tracking and machine-to-machine (M2M) applications.

Figure 2:
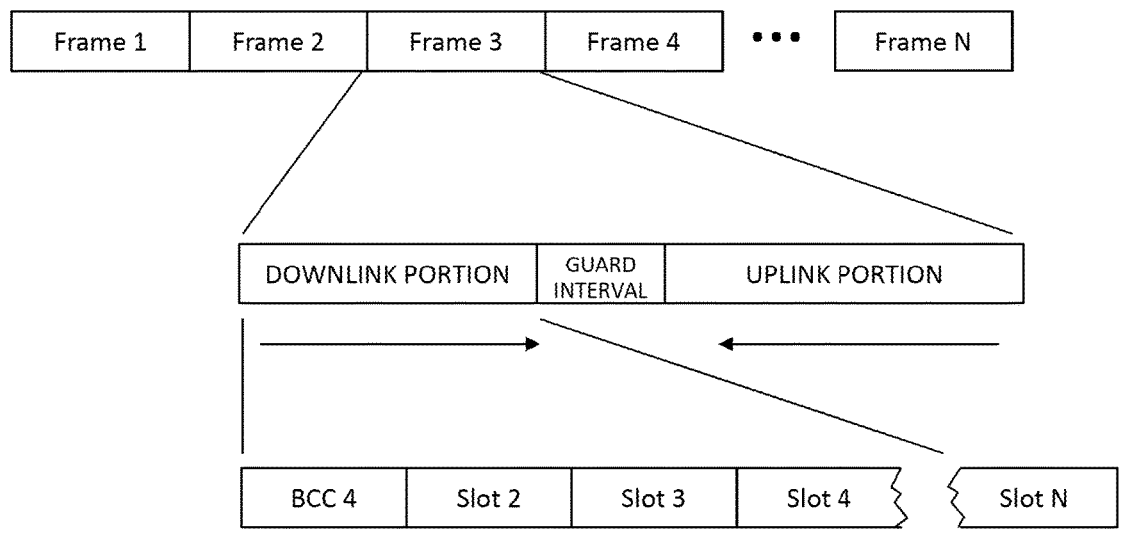
FIG. 2 is a diagrammatic illustration of an uplink/downlink communication frame airlink protocol that can be used by the communication system shown in FIG. 1.

As illustrated in FIG. 2, the wireless communications between REUs 12 and RGUs 16 are organized into sequential frames. Each frame includes a time division duplexed (TDD) downlink portion and an uplink portion that are separated in time by a guard band or interval. One (e.g., a first) radio transmits data during the downlink portions of the frames, and another (e.g., a second) radio communicating with that one or first radio by the communication frames transmits data intended for that one or first radio during the downlink portions of the frames. For purposes of example herein, transmissions by RGUs 16 are referred to as the downlink frame portions, and are received by REUs 12. By this convention, transmissions by REUs 12 in response to the downlink frame portions are referred to as the uplink frame portions, and are received by RGUs 16. Both the downlink and uplink frame portions include a plurality of subframes or slots that are predetermined or assigned to contain specific types of information. For example, one of the slots of the downlink frame portion transmitted by an RGU 16 is known as the broadcast control channel (BCCH), and includes information used by the REU 12 to control parameters such as transmission time, slot time and length, frequency, transmission power levels and/or modulation method of the associated and responsive uplink frame portion. Again for example, a slot in the uplink frame portion transmitted by the REU 12 is known as the random access channel (RACH), and can include the data from a sensor 14 coupled to that REU.

Figure 3:
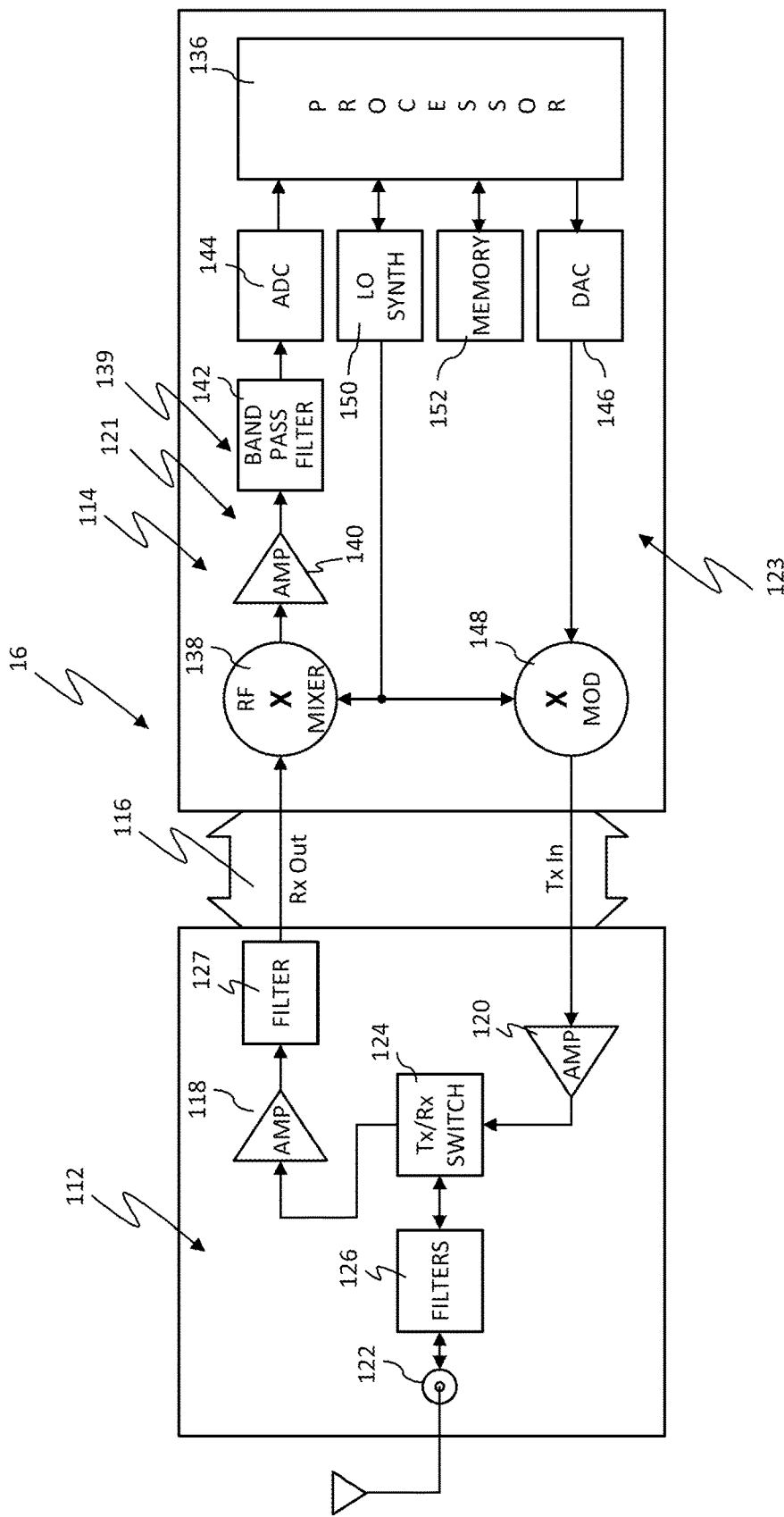
FIG. 3 is a diagrammatic block diagram of a broadband radio gateway unit (RGU) including an RF front end and modem module in accordance with embodiments of the invention.

FIG. 3 is a diagrammatic illustration of an RGU 16 in accordance with embodiments of the invention. REUs 12 and RRUs 20 can be similar in structure and operation to RGU 16. As shown, RGU 16 includes a radio frequency (RF) front end (RFFE) 112 coupled to modem module (MM) 114 by a connector 116. The RFFE 112 of the illustrated embodiment is configured for operation at specific carrier frequency bands, and the MM 114 is configured for wide band operation with any of the carrier frequency-specific RFFEs. Accordingly, the RFFE 112 includes band-specific receive (Rx) and transmit (Tx) low noise amplifier 118 and power amplifier 120, respectively, coupled to an antenna terminal 122 through a receive/transmit (Rx/Tx) switch 124. RFFE 112 can also include band-specific filters such as those shown at 126 and 127. Although only the receiver output from (Rx Out) and transmitter input to (Tx In) the RFFE 112 are expressly shown, other signal connections to the RFFE (e.g., a control signal to the receive/transmit switch 124) are coupled between the RFFE and MM 114 by the connector 116.

MM 114 includes a receiver section 121, a transmitter section 123, and processor 136. The receiver section 121 is a superheterodyne receiver and includes an RF mixer 138, intermediate frequency (IF) amplifier 140, IF band pass filter 142 and analog-to-digital converter (ADC) 144. Transmitter section 123 includes digital-to-analog converter (DAC) 146 and IQ modulator 148. The RF mixer 138 and modulator 148 are driven by a local oscillator (LO) synthesizer 150 that is coupled to the processor 136 in the illustrated embodiment. Processor 136, which is a digital signal processor (DSP) in embodiments, is coupled to memory 152. Data defining control and signal processing programs and algorithms used by the processor 136, as well as data or other information generated or used by the processor, can be stored in memory 152. RF mixer 138 shifts the carrier frequency of the received RF signal to an intermediate frequency. The received signal at the intermediate frequency is then modified or processed by the IF stage including amplifier 140 and IF band pass filter 142 before applied to the ADC 144. In one embodiment of the invention the intermediate frequency is nominally 140 MHz, and the IF receive signals are band pass filtered by an IF band pass filter 142 having a pass band of about 10 MHz. Other intermediate frequencies and pass bands are used in other embodiments. Processor 136 performs other receive signal processing, transmit signal processing and control functions. For example, the processor 136 performs an IF mixer function to shift the digital received signal from the intermediate frequency to the channel base band, and demodulates those signals. Base band transmit signals produced by the processor 136 are converted to analog form by DAC 146 and modulated onto the carrier by IQ modulator 144. The modulated transmit signals are then outputted to the RFFE 112 for transmission.

Figure 4:
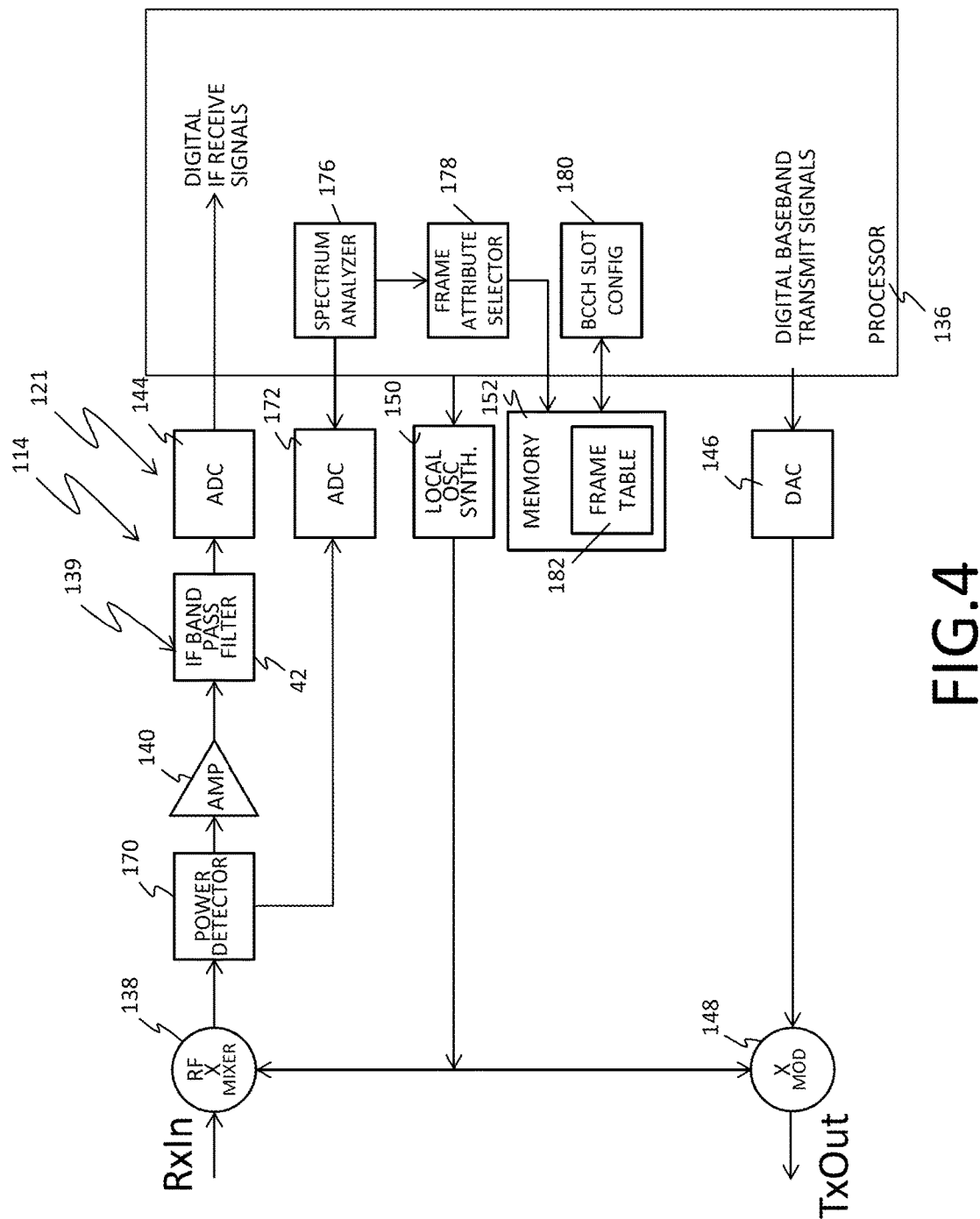
FIG. 4 is a more detailed block diagram of portions of the modem module of FIG. 3 in accordance with embodiments of the invention.

FIG. 4 is a more detailed diagrammatic illustration of a modem module 114, showing additional functional components that cooperate with other components of the modem module and its processor 136 to perform synchronization for interference mitigation in accordance with embodiments of the invention. As shown, a power detector 170 monitors and provides information representative of the power levels (e.g., RMS levels) of the received signals. In the embodiment shown in FIG. 4, the power detector 170 is an analog device in the receiver section 121, between the RF mixer 138 and amplifier 140, and the monitored power output signal is coupled to the processor 136 through an ADC 172. The power level of the receive signals can be monitored or determined at other locations in other embodiments (not shown). Processing and control functionality of processor 36 includes spectrum analyzer 176, frame attribute selector 178 and BCCH slot configurator 180. Memory 152 includes a frame table 182 or other logical structure for storing attributes of the downlink and/or uplink frame portions. Stored downlink frame portion attributes can include, for example, slot lengths, slot timing, communication frequencies and modulation methods. The slot timing attributes can include information specifying when other radios such as REUs 12 and/or RRUs 20 communicating with the RGU 16 should transmit the uplink frame portion of the frame. For example, the BCCH of the downlink frame portion transmitted by the RGU 16 can include data specifying the length of the guard interval following the end of the downlink frame portion. By providing this information, the RGU 16 can effectively control parameters such as the timing of the associated uplink frame portions it receives.

Uplink frame portions transmitted by other radios such as REUs 12 and RRUs 20 that are intended for receipt by a given RGU 16 may have relatively low power levels. This situation may occur, for example, when those transmitting REUs 12 and/or RRUs 20 are located relatively long distances from the RGU 16. Further complicating the ability of the RGU 16 to receive and process relatively low power uplink frame portions may be transmissions by other co-located RGUs 16 (e.g., other RGUs located on the tower 28). Interference from co-located RGUs 16 may be particularly problematic when it is at frequencies near those being used by the RGU 16 receiving the low power uplink frame portion. Interference of this type may be caused by co-located RGUs 16 of different vendors or radio manufacturers. Since the RGUs 16 of different vendors may have differences in communication frame protocols that are unknown to the other vendors, it can be difficult to effectively mitigate the effects of this interference.

Radios such as RGUs 16 in accordance with embodiments of the invention mitigate the effects of interference with other co-located RGUs 16 by monitoring and evaluating the spectral content of transmissions and/or received signals of the other radios, and adapting parameters or attributes of the downlink and/or uplink frame portions of their communication frames. In particular, the spectrum analyzer 176 monitors and evaluates the spectral characteristics of transmissions from other co-located RGUs 16 and transmissions from other remote radios that are intended for receipt by the co-located RGUs. The spectrum analyzer 176, which can include a Fourier transformer (not separately shown), performs a Fourier transform on the monitored power output signals from power detector 170, and generates spectral information such as signal strength, frequencies, phase and temporal content (i.e., the timing) of the received RF signals. Information produced by the spectrum analyzer 176 is coupled to the frame attribute selector 178. Based on the spectral characteristics, frame attribute selector 178 can determine the characteristics of those signals that are causing or may cause interference with communication frames of the RGU 16, and identify, select or otherwise determine attributes or other parameters of the downlink and/or uplink frame portions of the communication frames of the RGU that are optimized to manage or mitigate interference with other co-located RGUs. For example, frame attribute selector 178 can determine attributes representative of the startof-frame, guard interval lengths, lengths of downlink and uplink portions, modulation and encoding schemes and transmission power levels that will mitigate problems associated with receiving signals from remote REUs 12 and/or RRUs 20 when other co-located RGUs 16 are transmitting. The frame attributes determined in this manner can be stored in the frame table 182 of memory 152.

When an RGU 16 in accordance with the invention is generating data for transmission in downlink frame portions, it can include information representative of the stored attributes and parameters in the downlink frame portions, effectively providing instructions to a remote REU 12 and/or RRU 20 on how to transmit the uplink portions of the frames in a manner that mitigates interference between the RGU 16 and co-located RGUs. In the illustrated embodiment, for example, the BCCH slot configurator 180 of the RGU 16 accesses the frame table 182 and includes the interference-mitigating frame attributes from the memory 152 in the BCCH slots of the downlink frame portions of the signals transmitted by the RGU. The RGUs 16 thereby dynamically adapt to the spectral environment in which they are operating without the receipt of timing or other control signals from other radios in that environment.

In one embodiment, for example, the RGU 16 identifies the time periods that one or more co-located RGUs are transmitting frame portions. The RGU 16 then updates its frame table in such a manner as to instruct or cause uplink frame portions from REUs 12 or RRUs 20 with which it is communicating to be transmitted by those REUs or RRUs and received by the RGU 16 during time periods that the co-located RGUs are not transmitting. In another embodiment, the RGU 16 identifies the frequencies that one or more co-located RGUs are transmitting frame portions. The RGU 16 then updates its frame table in such a manner as to instruct or cause uplink frame portions from REUs 12 or RRUs 20 with which it is communicating to be transmitted by those REUs or RRUs and received by the RGU 16 at a frequency different than that of the co-located RGUs. By dynamically configuring parameters to cause transmitting and/or receiving during the same time periods and/or at different frequencies as co-located RGUs 16, an RGU is able to synchronize with those co-located RGUs and mitigate the effects of interference. The identified characteristics of the co-located radios that the RGU 16 adjusts to in order to mitigate interference will typically be relatively periodic and static, changing relatively infrequently. RGUs 16 configured in accordance with the invention to mitigate interference with co-located RGUs can therefore perform the methods described herein periodically, at a rate that is less than the communication frame rate, while maintaining synchronized interference mitigation with those co-located RGUs.

Although the invention has been described with reference to preferred embodiments, those of skill in the art will recognize that changes can be made in form and detail without departing from the spirit and scope of the invention. By way of non-limiting examples, techniques described herein may be applied to various wireless access systems such as code division multiple access (CDMA), frequency division multiple access (FDMA), time division multiple access (TDMA), orthogonal frequency division multiple access (OFDMA), single carrier frequency division multiple access (SC-FDMA), etc. CDMA may be embodied by radio technology such as universal terrestrial radio access (UTRA) or CDMA2000. TDMA may be embodied by radio technology such as global system for mobile communications (GSM)/general packet radio service (GPRS)/enhanced data rates for GSM evolution (EDGE). OFDMA may be embodied by radio technology such as IEEE 802.11 (Wi-Fi), IEEE 802.16 (WiMAX), IEEE 802-20, evolved UTRA (E-UTRA), Bluetooth, Zigbee, IEEE 802.15.4, etc.

The invention claimed is:

1. A method for operating a first of a plurality of co-located, non-time synchronous radios at a first location communicating data by frames with one or more other remote radios at a second and optionally additional locations in a wireless communication system, to synchronize first or uplink and/or second or downlink frame portions of the frames to mitigate interference between the co-located radios, comprising:
    storing a frame table of attributes of uplink and/or downlink frame portions associated with frames of the first radio;
    wirelessly receiving at the first radio RF transmissions from at least a second of the co-located radios;
    monitoring by the first radio the spectral content of the RF transmissions from the at least second co-located radio;
    determining by the first radio, based on the monitored spectral content, characteristics for uplink and/or downlink frame portions of the first co-located radio to mitigate interference with the at least second co-located radio; and
    updating attributes in the frame table to enable interference-optimized uplink and/or downlink portions of frames of the first co-located radio.

2. The method of claim 1 and further including generating and transmitting from the first co-located radio uplink and/or downlink frame portions based on the updated stored attributes in the frame table.

3. The method of claim 2 wherein the method is used by a co-located radio such as a radio gateway unit, and generating and transmitting frame portions includes generating and transmitting downlink frame portions.

4. The method of claim 3 wherein generating and transmitting downlink frame portions includes generating and transmitting downlink frame portions with data instructing the one or more other remote radios with which the first co-located radio is communicating data to transmit uplink frame portions during time periods that the at least second co-located radio is not transmitting.

5. The method of claim 1 wherein the steps of monitoring the content and updating attributes are done periodically, and optionally at a rate that is less than a rate of successive transmissions of the at least second co-located radio.

6. The method of claim 1 wherein updating the attributes in the frame table includes updating attributes to cause the first co-located radio to generate and transmit frame portions during time periods that the at least second co-located radio is transmitting.

7. The method of claim 1 wherein updating the attributes in the frame table includes updating attributes to cause the first co-located radio to receive frame portions from one or more other remote radios with which the first radio is communicating data during time periods that the at least second co-located radio is not transmitting.

8. Operating a plurality of the co-located radios in accordance with the method of claim 1.

9. A radio configured to operate in accordance with claim 1.

10. The method of claim 1 wherein at least the first and second co-located radios are manufactured by different companies.

11. The method of claim 1 wherein updating the attributes in the frame table includes updating attributes to cause the first co-located radio to receive frame portions from one or more other remote radios with which the first radio is communicating data at a frequency that the at least second co-located radio is not transmitting.

\* \* \* \* \*